July 24, 1923.

W. R. HEMELSTRAND

HOG TROUGH

Filed March 13, 1923

1,462,793

Inventor
W. R. Hemelstrand

By Philip A. Ferrell
Attorney

Patented July 24, 1923.

1,462,793

UNITED STATES PATENT OFFICE.

WALTER R. HEMELSTRAND, OF EDISON, NEBRASKA.

HOG TROUGH.

Application filed March 13, 1923. Serial No. 624,804.

*To all whom it may concern:*

Be it known that WALTER R. HEMELSTRAND, a citizen of the United States, residing at Edison, in the county of Furnace and State of Nebraska, has invented certain new and useful Improvements in Hog Troughs, of which the following is a specification, reference being had therein to the accompanying drawings.

The invention relates to hog troughs, and has for its object to provide a device of this character particularly adapted for use by brood sows, and constructed in such a manner that it cannot be turned over by the sows rooting under the same, and consequently small pigs will not be injured, as is now common in the troughs at present constructed.

A further object is to provide a channeled bracket, which may be attached to a support, which channeled bracket is vertically disposed and has slidably mounted therein a member, which member is provided with a swivel connection with the trough, which connection not only allows the trough to move around in a horizontal plane on the ground in case of rooting, and at the same time preventing the trough from being turned over, but also allows the trough to be bodily turned over after being raised for cleaning purposes.

A further object is to provide the trough with spaced walls between which a packing machine may be disposed for preventing material within the trough from easily freezing, adding weight to the trough, and at the same time forming a rigid structure.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figures 1, 2:
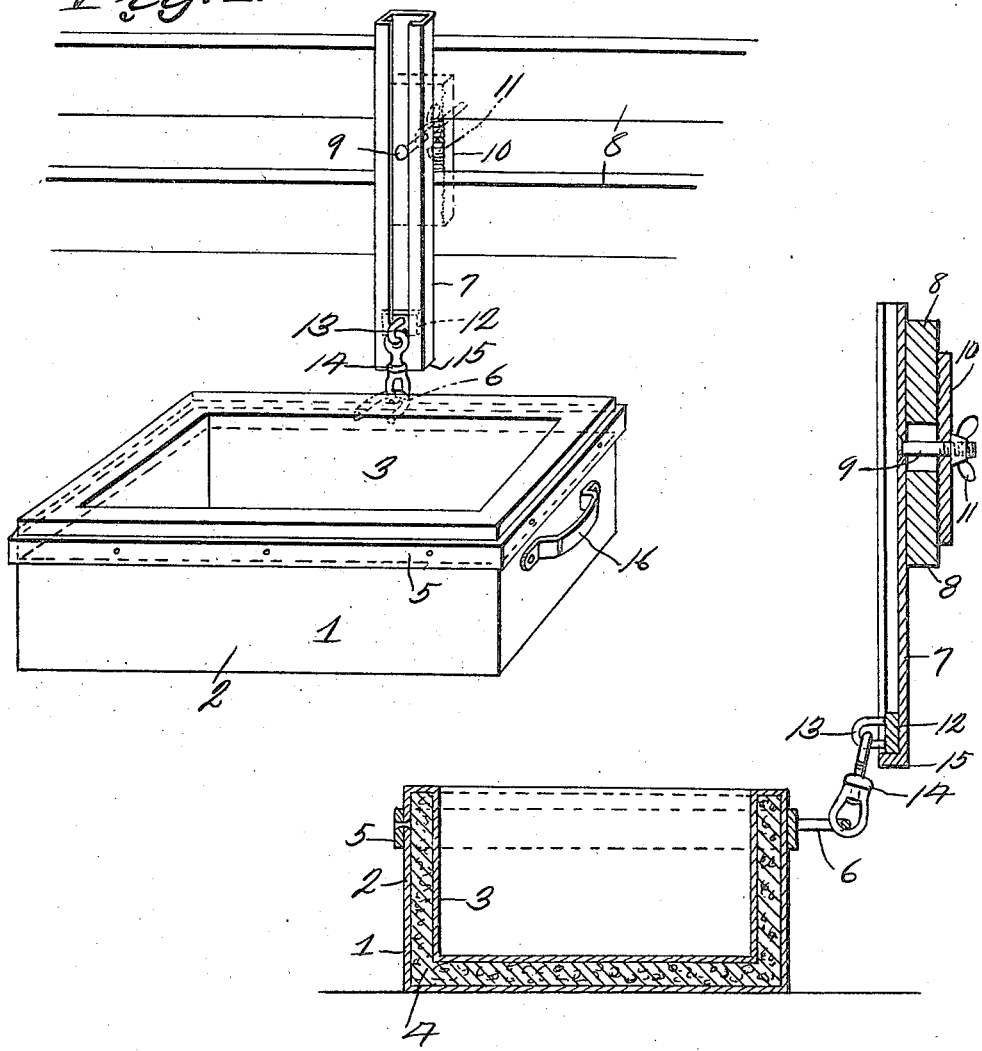
Figure 1 is a perspective view of the trough, showing the same attached to a support.
Figure 2 is a vertical transverse sectional view through the trough, bracket and support.

Referring to the drawing, the numeral 1 designates a trough, which is preferably rectangular shaped and which comprises the outer wall 2, and inner wall 3. Disposed between the walls 2 and 3 is a packing 4 formed of asbestos or the like for preventing material within the tank from easily freezing. The double walls and material 4 also add weight to the trough as well as rigidity. Extending around the trough 1 adjacent its upper end is a rectangular shaped band 5, which band at its rear side is provided with an eye 6, horizontally disposed. It has been found that troughs of conventional form now in use are easily turned over on small pigs, particularly by brood sows rooting under the same. To obviate this difficulty the trough is secured to a vertically disposed channeled member 7, which is secured to a support 8, such for instance as pen rails, by means of a bolt 9 carried by the channeled member 7, which bolt extends between the rails 8, and through a plate 10 engaging the opposite sides of the rails. It will be seen that the channeled member is securely held in a vertical position, and by loosening the thumb nut 11 the channeled member can be easily removed from the supporting rails. Disposed in the channeled member 7 is a vertically slidable block 12, which block is provided with an outwardly extending eye 13. Connecting the eye 13 of the block 12 and the eye 6 carried by the band 5, is a swivel connection 14, which connection, as well as the lower end 15 of the channelled member 7 is disposed above the trough 1 and consequently it will be seen that when a hog roots under the trough, said trough will move laterally if the rooting is to one side of the center thereof, or will not move at all, that is, far enough to overturn, if the rooting is centrally, consequently the trough cannot be turned over on the young pigs, which is now a difficulty with hog troughs.

One end of the trough is provided with a handle member 16 adapted to be grasped when it is desired to raise the trough upwardly from the ground for turning the same over, for instance for cleaning purposes. By providing the channel member 7, it is obvious that the slidable block 12 may be easily removed for removing the trough and also the trough may be disposed at various elevations and held against overturning.

From the above it will be seen that a hog trough is provided, which cannot be turned over, and one wherein material within the trough will not easily freeze. It will also be seen that the device is simple in construction, and the working parts reduced to a minimum, thereby reducing the possibility of breaking.

The invention having been set forth what is claimed as new and useful is:—

1. The combination with a hog trough, of means for attaching the same to a support, said means comprising a vertically disposed channeled member, a block removably disposed within the channelled member and a swivelled connection between the block and the trough.

2. The combination with a hog trough, a support, means for attaching the trough to the support, said means comprising a vertically disposed channelled member, a block slidably mounted in the channeled member, means for limiting the downward movement of the block and a swivelled connection between the block and trough, said swivelled connection being disposed above the trough.

3. The combination with a hog trough, a support, means for attaching the trough to the support, said means comprising a vertically disposed channeled member, means for attaching the channeled member to the support, a block slidably mounted in the channeled member, means for limiting the downward movement of the block, an eye carried by the block, a band extending around the trough adjacent its upper end, an eye carried by said band and a swivelled connecting member connecting the eye of the band and the eye of the block.

In testimony whereof I hereunto affix my signature.

WALTER R. HEMELSTRAND.